Jan. 15, 1963　　　　　D. L. NICHOLS　　　　　3,074,047
VARIABLE RESISTANCE LIQUID TELEMETERING COMPASS
Filed Nov. 19, 1959　　　　　　　　　　　　　　　3 Sheets-Sheet 1

INVENTOR.
DONALD L. NICHOLS
BY
ATTORNEYS

Jan. 15, 1963  D. L. NICHOLS  3,074,047
VARIABLE RESISTANCE LIQUID TELEMETERING COMPASS
Filed Nov. 19, 1959  3 Sheets-Sheet 2

INVENTOR.
DONALD L. NICHOLS
BY
*Max A. Gammer*
ATTORNEYS

RC OSCILLATOR

United States Patent Office 3,074,047
Patented Jan. 15, 1963

3,074,047
**VARIABLE RESISTANCE LIQUID TELE-
METERING COMPASS**
Donald L. Nichols, Saxonville, Mass., assignor to the
United States of America as represented by the Secretary of the Navy
Filed Nov. 19, 1959, Ser. No. 854,207
6 Claims. (Cl. 340—2)
(Granted under Title 35, U.S. Code (1952), sec. 266)

The invention described herein may be manufactured and used by or for the Government of the United States of America for governmental purposes without the payment of any royalties thereon or therefor.

This invention relates to the transmission of azimuth orientation and more particularly to directional radiosono buoys.

Radio-sono buoys are employed for the detection and transmission of water sounds made by submarines and are launched in various manners, as for example, by aircraft. The radio signal transmitted from the buoy to the plane or to a surface ship, indicates both the presence of underwater craft and their relative direction with respect to the buoy. By this means, the effectiveness of submarine search and detection is considerably increased. Buoys of this type comprise a directional hydrophone for underwater sound detection attached to the buoy, a motor and paddles for slowly rotating the buoy while in the water, a transmitter which is frequency modulated in accordance with the rotation of the buoy so as to indicate to orientation of the hydrophone or buoy at any instant. The sounds detected by the hydrophone are converted into electrical signals which are amplified and also frequency modulate the transmitter carrier.

Several methods have been suggested for the transmission of direction information from the directional sono buoy. The first employs a small capacitor as part of a compass assembly to shift the carrier frequency of the sono buoy transmitter as a function of the angle between the index azimuth of the buoy and magnetic north. A disadvantage of this system is that the transmitter oscillator which determines the carrier frequency must be self-excited so that its frequency may be readily changed by the compass capacitor. This type of self-excited oscillator is inherently less stable than a crystal controlled oscillator and therefore a much larger portion of the radio frequency spectrum is occupied than is required to transmit the orientation information. An alternative is to allow the drift to become appreciable with respect to the frequency change introduced by the compass capacitor and thereby accept considerable error. Nevertheless, this compass capacitor is unsuitable for modulating a low frequency oscillator because of its inherent low capacitance.

Another suggested method employs a large, expensive capacitor which is turned by a compass element, and since the capacitor is large it may be employed to vary the frequency of a low frequency oscillator which, in turn, modulates the carrier frequency. The low frequency oscillator in this system is frequency shifted by an amount which is large with respect to the oscillator drift but the radio frequency spectrum is, however, conserved since the frequency of the oscillator involved is relatively low. This method, however, exhibits certain inherent disadvantages in that the cost is extremely high, additional weight is introduced due to the large physical size of the compass capacitor and a large force is required to rotate the capacitor.

An object of this invention is to provide a simple and practical telemetering compass for varying the frequency of a stable oscillator.

Another object is to provide a damped fluid telemetering compass for varying the frequency of a sono buoy resistance controlled oscillator relative to the azimuth orientation of the buoy.

A further object of this invention is to provide a telemetering compass suitable for use with both low and high frequency oscillators whereby the radio frequency spectrum will be conserved.

A still further object is to provide a mechanically simple, efficient, light weight, inexpensive, practical and reliable telemetering azimuth orientation compass system.

Other objects and advantages will be apparent from the following description of an embodiment of the invention and the novel features thereof will be particularly pointed out hereinafter in connection with the appended claims.

Figure 1:
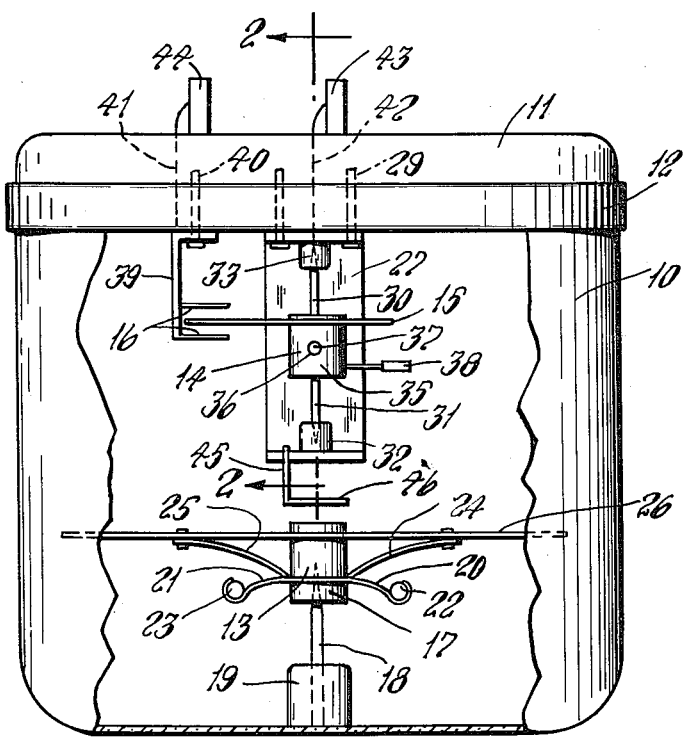
FIG. 1 is a front elevation with a portion of the container removed, to illustrate the interior structure of an embodiment of this invention.
Figure 2:
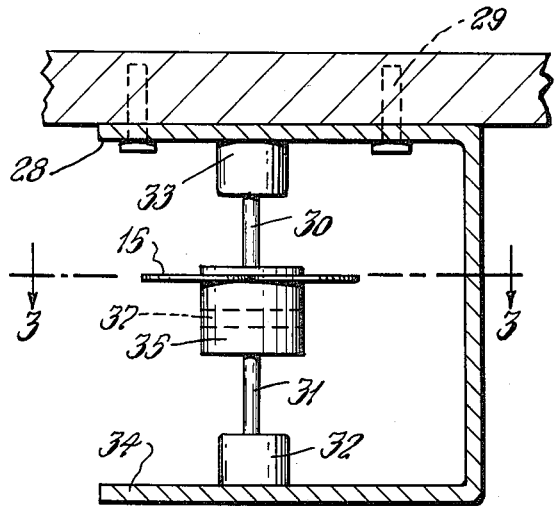
FIG. 2 is a sectional elevation through a part of the interior of the container as viewed approximately along the line 2—2 of FIG. 1.

In the embodiment of the invention illustrated in FIG. 1, a glass container 10 having an open end closed by a plastic cap 11 which is retained thereon by a brass ring 12, contains an electrically conductive liquid filling, a fixed azimuth assembly 13, a follower compass assembly 14 and a pair of electrode elements 15 and 16. The container 10 and the cap 11 may be made of any suitable corrosion resistant, non-magnetic material while the electrically conductive liquid may be any suitable liquid, as for example, alcohol with detergent added.

The fixed azimuth assembly 13 employs a cylindrical brass spider 17 having a lower pin extension 18 mounted for rotation about the central axis 2 of the spider and for pivotal and rockable motion, in a jeweled bearing 19 attached to the bottom inner surface of the container 10, whereby the entire fixed azimuth assembly may rotate and pivot with a minimum of friction. Opposing radial arms 20 and 21 of the spider 17 support two cylindrical bar magnets 22 and 23 parallel to each other and disposed in the same horizontal plane on opposite sides of the spider with their north poles pointing in a similar direction. The bar magnets preferably, should be powerful and made of any suitable highly magnetic material as for instance, tantalum tungsten. Another pair of radially extending opposing spider arms 24 and 25 fixedly support a disk-like damping member 26 which has an aperture (not shown) through its center from face to face. The damping member 26 is supported in the horizontal plane with its axis aligned with the spider axis and a small upper portion of the spider extends through and beyond the aperture in the damping member in an upward direction. This fixed azimuth assembly 13 behaves as a normal compass in that north seeking poles of the bar magnets rotate the fixed azimuth assembly on bearing 19, so that they are continually oriented toward magnetic north irrespective of the orientation of the container 10.

Figure 3:
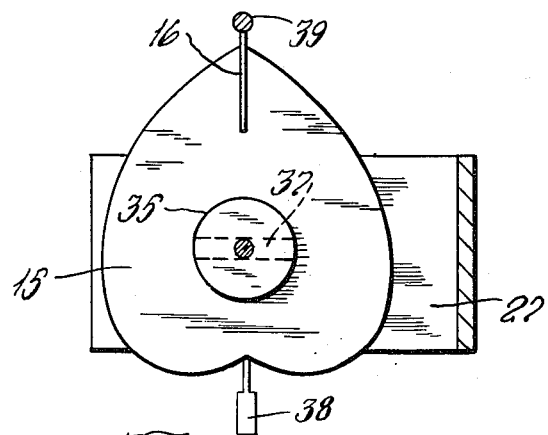
FIG. 3 is a sectional plan as viewed approximately along line 3—3 of FIG. 2.

Supported from the inner surface of the plastic cap 11 and disposed above the fixed azimuth assembly is a brass yoke 27 whose upper arm 28 is securely attached to the cap 11 by screws 29 passing through the yoke arm and threaded into the cap 11. Mounted between the arms of the yoke 27 for rotation about a vertical axis aligned with the vertical axis 2 of the fixed azimuth assembly 13 is a brass follower compass assembly 14. Opposite free ends 30 and 31 of the follower azimuth assembly are formed so as to be received by the jeweled bearings 32 and 33 mounted on the opposing inner surfaces of the yoke arms 28 and 34. A portion 35 of the follower assembly disposed approximately between the opposite ends 30 and 31 of the follower assembly is enlarged to form a cylinder whose axis is aligned with that of the fixed azimuth assembly. Affixed to the periphery of the cylinder 35 and disposed perpendicular to the axis of the cylinder and spaced slightly below the upper end of the cylinder is an aluminum disk-like rotor electrode 15. The shape of the rotor electrode illustrated in FIG. 3 is cardioid (heart shape), but any suitable shape may be employed as will be explained hereinafter.

The rotor electrode 15 is mounted on the cylinder 35, for rotation with the cylinder, eccentrically of its axis of rotation, so that the disc electrode 15 will pass to varying extents between the fork electrodes as the disc electrode rotates with cylinder 35. An aperture 36 extends through the cylinder along a horizontal diameter of the cylinder below the plane of the rotor electrode 15 and has secured therein a bar magnet 37. Since the rotor electrode 15 is mounted eccentrically, the cylinder 35 is provided with a radially extending counter weight 38 disposed below the plane of the rotor electrode and diametrically opposite the larger radial portion of the rotor electrode so as to balance the greater off-center portion of the rotor electrode.

An inverted brass L shaped support 39 having its shorter leg secured to the inner surface of the plastic cap by screws 40 has two wire-like laterally extending electrodes or forks 16 at the lower end portion of the other or longer leg. The fork electrodes 16 extend along opposite faces of the disk electrode and are disposed in parallel spaced relation to each other and parallel to the plane of the disk electrode 15. The longer leg of the inverted L 39 is parallel to the axis of rotation of the follower assembly and spaced from the periphery of the disk electrode 15, thereby permitting free rotation of the follower assembly. Wire conductors 41 and 42 pass through cap 11, are sealed thereto internally with one wire connected to the rotor electrode 15 while the other is connected to the fork electrodes 16. Externally, the wires 41 and 42 are connected individually to terminal posts 43 and 44 which are mounted on the outside surface of the cap 11.

It should be noted that since the compass assembly container 10 is securely mounted to a buoy which tilts and rolls, the compass follower assembly 14 has been mounted so that this buoy motion will not be imparted to the rotor electrode relative to its position with respect to the fork electrodes 16 since they are both securely fixed to the cap 11. As the buoy is rotated at a constant speed the container 10 similarly rotates but the bar magnets 22 and 23 of the fixed azimuth assembly prevent the fixed assembly from rotating and it remains fixed in a north-south orientation. The damping member 26 gives the fixed azimuth assembly horizontal stability and damps out any vibratory motion imparted to the fixed azimuth assembly by the action of the waves on the buoy. A lower L shaped member 45 is rigidly affixed to the lower arm of the yoke 27, having its lower leg 46 disposed in proximity and parallel to the upper edge of the spider 17 so as to limit the tilting of the fixed azimuth assembly 13. Since the magnet 37 of the follower assembly 14 is close to the bar magnets 22 and 23 of the fixed azimuth assembly, it is controlled by the strong magnetic field of the latter magnets and will thereby maintain the rotor electrode at a constant orientation, irrespecive of the orientation of the rotating container 10.

The rotation of the buoy causes the fork electrodes 16 to rotate with respect to the rotor electrode 15 which maintains a constant orientation relative to magnetic north, and the surface area of the rotor electrode 15 interposed between the fork electrodes 16 varies with the relative orientation of the container 10 and the buoy hydrophone. Since the container fluid is electrically conductive, this buoy rotation varies the resistance between the forks 16 and rotor electrode 15 in a predetermined manner dependent on the shape of the rotor electrode. The cardioid shape illustrated in FIG. 3 has been used successfully. However, other suitable shapes may be employed providing that the rotation of the buoy results in a repeatable, predetermined directionally varying resistance between the electrodes without any abrupt resistance discontinuity. Since the rotor electrode 15 is disposed between the two fork electrodes 16, if the rotor is not absolutely flat, compensation will occur in that, should the distance between the rotor electrode and one of the fork electrodes increase, the distance between the rotor and the other of the fork electrode will correspondingly decrease and any variation in resistance, therefore, will be due solely to the relative motion between the fork and rotor electrodes as the buoy rotates.

Figure 4:
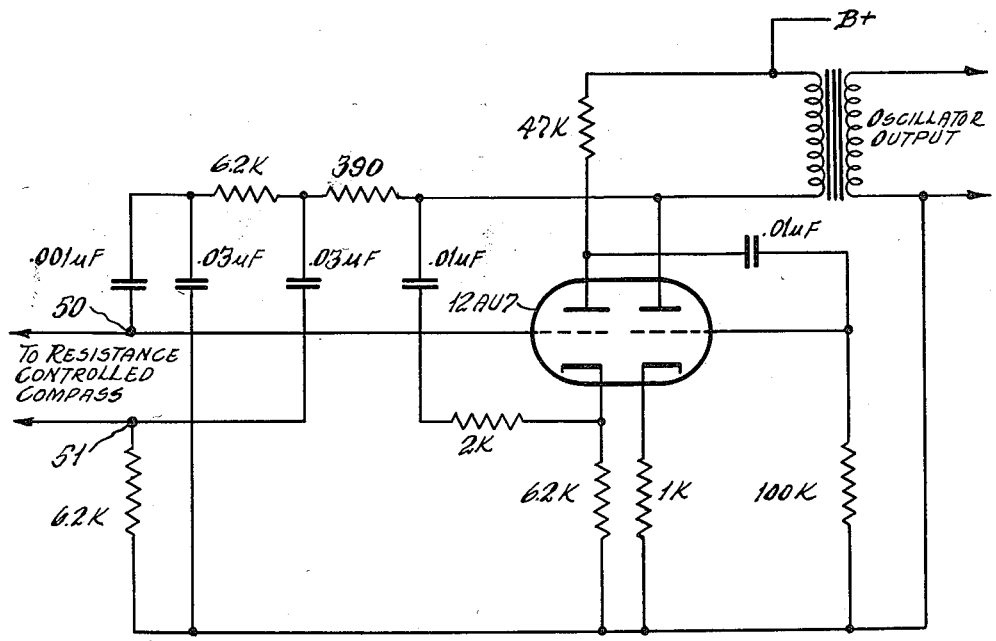
FIG. 4 is a schematic diagram illustrating an oscillator which may be used in conjunction with this invention.

The terminals 43 and 44 may be connected to any suitable RC oscillator, as for example, the oscillator illustrated in FIG. 4, so that the variable resistance of the telemetering compass is connected across the terminals 50 and 51. The resistance across the latter mentioned terminals (circuit capacitance being fixed) determines the frequency of oscillation of the oscillator, which is then fed into the sono buoy transmitter. In effect, therefore, as the sono buoy rotates the frequency of transmission varies in accordance with this rotation and this frequency variation may be employed to determine the relative orientation of the sono buoy at any instant by a receiver remote from the sono buoy.

Any type of compass construction may be used which permits two compass elements (electrodes) to move relative to one another in an electrically conductive liquid so as to cause a predetermined resistance variation between them. Further, the variation in resistance between the electrodes may be employed to stably change the transmission frequency of either a low frequency transmitter system (as illustrated) or a high frequency transmitter.

It will be understood that various other changes in details, materials and the arrangements of parts which have been herein described and illustrated in order to explain the nature of this invention, may be made by those skilled in the art within the principle and scope of the invention, as expressed in the appended claims.

I claim:

1. An azimuth orientation sensing device comprising a closed envelope filled with an electrically conducting liquid and containing therein a fixed azimuth direction assembly, a pair of electrodes, one of which is fork shaped with a pair of tines and rigidly supported relative to said envelope and the other of said electrodes is supported for relative orientation with said fixed azimuth assembly, circuit means connected in series with said electrodes, said electrodes being in spaced relation from one another with the other of said electrodes having a portion thereof interposed between the tines of said fork shaped electrode, whereby rotation of said envelope will vary the resistance through said liquid between said electrodes in a predetermined variable manner dependent on the relative azimuth orientation of said envelope and the variation of the resistance may be applied from said electrodes to a selected location external of said envelope by said circuit means.

2. A directional radio-sono buoy having a transmitter with a resistance controlled oscillator and a floating member, the attachment therefor which comprises, a closed envelope formed for fixed mounting on said buoy, filled with an electrically conducting liquid and containing, in said liquid, a fixed azimuth direction assembly having a broad surface damping member affixed thereon and mounted within said envelope for universal rocking, a pair of electrodes in said liquid, one of which is rigidly supported relative to said envelope and the other of which is supported for rotation and orientation with said fixed azimuth assembly, said electrodes being in spaced relation from one another, circuit means connecting said electrodes with said controlled oscillator, whereby rotation of said buoy will vary the resistance through said liquid between said electrodes in a predetermined variable manner and thusly vary the frequency of said transmitter dependent on the relative azimuth orientation of said buoy.

3. The device according to claim 2, wherein said other electrode is substantially planar and cardioid shaped.

4. The device according to claim 2, further including means for limiting the rocking movement of said fixed azimuth assembly.

5. An azimuth orientation sensing device comprising a closed envelope filled with an electrically conducting liquid and containing therein a fixed azimuth direction assembly, a pair of electrodes, one of which is rigidly supported relative to said envelope and the other of said electrodes is supported for relative orientation with said fixed azimuth assembly, said other electrode being substantially planar and cardioid shaped, circuit means connected in series with said electrodes, said electrodes being in spaced relation from one another, whereby rotation of said envelope will vary the resistance through said liquid between said electrodes in a predetermined variable manner dependent on the relative azimuth orientation of said envelope and the variation of the resistance may be applied from said electrodes to a selected location external of said envelope by said circuit means.

6. The device according to claim 5, wherein said fixed azimuth assembly also includes a magnet element whereby said fixed azimuth assembly is fixedly oriented.

References Cited in the file of this patent
UNITED STATES PATENTS

| | | |
|---|---|---|
| 2,466,763 | Davis | Apr. 12, 1949 |
| 2,665,896 | Kirby et al. | Jan. 12, 1954 |
| 2,698,428 | Wikkenhauser | Dec. 28, 1954 |
| 2,828,475 | Mason | Mar. 25, 1958 |